(12) United States Patent
Kasper et al.

(10) Patent No.: US 12,510,120 B2
(45) Date of Patent: *Dec. 30, 2025

(54) ADAPTER INCLUDING AN ADAPTER SHAFT, A CLUTCH PART, AND A BEARING

(71) Applicant: SEW-EURODRIVE GMBH & CO. KG, Bruchsal (DE)

(72) Inventors: Jürgen Kasper, Lingenfeld (DE); Wolfgang Brand, Linkenheim-Hochstetten (DE); Philipp Bossert, Karlsbad (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 61 days.

This patent is subject to a terminal disclaimer.

(21) Appl. No.: 18/573,507

(22) PCT Filed: May 31, 2022

(86) PCT No.: PCT/EP2022/064776
§ 371 (c)(1),
(2) Date: Dec. 22, 2023

(87) PCT Pub. No.: WO2022/268455
PCT Pub. Date: Dec. 29, 2022

(65) Prior Publication Data
US 2024/0288035 A1    Aug. 29, 2024

(30) Foreign Application Priority Data
Jun. 22, 2021   (DE) .......................... 102021003176.8

(51) Int. Cl.
*F16C 35/07* (2006.01)
*F16D 11/14* (2006.01)

(52) U.S. Cl.
CPC .............. *F16C 35/07* (2013.01); *F16D 11/14* (2013.01); *F16C 2361/61* (2013.01); *F16D 2300/08* (2013.01)

(58) Field of Classification Search
CPC .......... F16C 35/073; F16C 35/07; F16D 3/68; F16D 3/64
See application file for complete search history.

(56) References Cited

U.S. PATENT DOCUMENTS

| | | | |
|---|---|---|---|
| 3,301,614 A * | 1/1967 | Haentjens | F16C 35/073 384/472 |
| 12,305,744 B2 * | 5/2025 | Bossert | F16H 57/033 |
| 2014/0202271 A1 | 7/2014 | Oberndörfer | |

FOREIGN PATENT DOCUMENTS

| | | | |
|---|---|---|---|
| DE | 29915624 U1 * | 12/1999 | ............... F16D 3/60 |
| DE | 102009009459 A1 | 8/2010 | |

(Continued)

OTHER PUBLICATIONS

International Report on Patentability issued in corresponding International Application No. PCT/EP2022/064776, dated Dec. 14, 2023, pp. 1-8, English Translation.

(Continued)

*Primary Examiner* — Daniel D Yabut
(74) *Attorney, Agent, or Firm* — Carter, DeLuca & Farrell LLP (57) ABSTRACT

An adapter, e.g., for a geared motor, includes an adapter shaft, a clutch part, and a bearing, e.g., a rolling bearing. The adapter part has dogs, e.g., dogs protruding in the axial direction, and the inner ring of the bearing is fitted onto a bearing seat, e.g., a finely machined bearing seat, provided on the adapter shaft. The bearing seat covers, in the axial direction, a first region in which the bearing seat is uninterrupted in the circumferential direction, and a second region (Continued)

in which the bearing seat is interrupted in the circumferential direction, e.g., at multiple points.

21 Claims, 6 Drawing Sheets

(56) References Cited

FOREIGN PATENT DOCUMENTS

| | | | |
|---|---|---|---|
| DE | 202011000964 U1 | 7/2012 | |
| DE | 102015210227 A1 | 12/2016 | |
| DE | 102015115001 A1 * | 3/2017 | ............. F16H 55/36 |
| DE | 102016117466 A1 | 3/2018 | |
| DE | 102019003546 A1 | 12/2019 | |
| FR | 3136024 A1 * | 12/2023 | ............. F16D 11/14 |
| WO | 2015036832 A1 | 3/2015 | |

OTHER PUBLICATIONS

International Search Report issued in corresponding International Application No. PCT/EP2022/064776 dated Sep. 21, 2022, pp. 1-2, English Translation.

* cited by examiner

ADAPTER INCLUDING AN ADAPTER SHAFT, A CLUTCH PART, AND A BEARING

FIELD OF THE INVENTION

The present invention relates to an adapter, e.g., for a geared motor, including, for example, an adapter shaft, a clutch part, and a bearing, e.g., a rolling bearing.

BACKGROUND INFORMATION

In certain conventional systems, a geared motor has an electric drive which drives a transmission.

An adapter for a drive is described in German Patent Document No. 10 2019 003 546.

SUMMARY

Example embodiments of the present invention provide a geared motor which is as compact as possible.

According to example embodiments of the present invention, an adapter, e.g., for a geared motor, includes an adapter shaft, a clutch part, and a bearing, e.g., a rolling bearing. The adapter part has dogs, e.g., dogs protruding in the axial direction, and the inner ring of the bearing is fitted onto a bearing seat, e.g., a finely machined bearing seat, provided on the adapter shaft. The bearing seat covers, in the axial direction, a first region in which the bearing seat is uninterrupted in the circumferential direction, and a second region in which the bearing seat is interrupted in the circumferential direction, e.g., at multiple points.

Thus, the adapter has a very compact configuration. However, an interrupted bearing seat is provided. Since the interrupted bearing seat is arranged in the dog region, however, and the dogs are very rigid because a high torque has to be transmitted, the bearing is accommodated with sufficient stability.

According to example embodiments, a damping part is arranged between the dogs of the clutch part and the dogs of the adapter shaft. For example, the damping part has a base body and beam regions formed thereon which protrude in the radial direction. The beam regions are arranged axially between one dog of the clutch part and one of the adapter part. Thus, the torque transmission is play-free and torque fluctuations can be damped.

According to example embodiments, a circumferential cutout, e.g., a recess, is arranged on the adapter shaft in the axial direction between the first region and the second region. Thus, although the bearing seat is also interrupted at this point, bulges of the adapter shaft in the region of the cutout are at a distance from the inner ring of the bearing. The bulges are caused when the dogs are deflected elastically, e.g., when torque shocks are to be transmitted.

According to example embodiments, the region covered by the dogs in the axial direction includes the second region and is at a distance from the first region in the axial direction. Thus, the bearing seat has both regions, and the dogs are at a distance from the uninterrupted region. This stable region is thus decoupled from the elastically deflectable dogs.

For example, the axial direction is aligned parallel to the axis of rotation of the adapter shaft, and the circumferential direction and/or the radial distance is or are relative to this axis of rotation.

According to example embodiments, the inner ring is axially delimited on both sides by retaining rings. Thus, the first bearing is arranged as a fixed bearing.

According to example embodiments, a first retaining ring is accommodated in a first annular groove, e.g., a first annular groove which extends completely and/or uninterruptedly in the circumferential direction, of the adapter shaft and delimits the inner ring. The first annular groove is at a distance from the first region and/or from the dogs in the axial direction. Thus, the first retaining ring is accommodated in a stable, uninterrupted annular groove. However, the second retaining ring is accommodated in an interrupted annular groove, i.e., in an annular groove made through in the dogs.

According to example embodiments, a second retaining ring delimits the inner ring, e.g., on the side of the inner ring facing away from the first retaining ring in the axial direction, and the second retaining ring is accommodated in a second annular groove. Thus, the inner ring of the bearing is delimited, even if the delimitation is arranged in the seat region, which is interrupted at multiple points in the circumferential direction. This results in a particularly compact configuration.

According to example embodiments, the second annular groove is interrupted in the circumferential direction, e.g., at multiple points, and/or the second annular groove is arranged in the second region. Thus, the adapter has a very compact configuration, as the inner ring of the bearing partially protrudes axially into the region of the dogs.

According to example embodiments, the second annular groove is provided in the dogs of the adapter part and/or in the dogs of the clutch part. Thus, the retaining ring is securely accommodated in the axial direction.

According to example embodiments, the second annular groove is uninterrupted in the circumferential direction and is provided in the clutch part. Thus, the axial securing is not made possible directly in the adapter shaft, but in another part, e.g., in the clutch part. Thus, the inner ring even protrudes partially over the dog region of the clutch part. This means that the adapter can be built very compactly.

According to example embodiments, the adapter has a housing which has a first and a second housing part. The first housing part is connected to the second housing part, and the outer ring of the bearing is accommodated in the first and second housing part and centers the first relative to the second housing part. Thus, the outer ring centers the two housing parts in relation to each other. The bearing thus additionally assumes a centering function.

According to example embodiments, the bearing is arranged as a fixed bearing. Thus, the bearing is axially fixed.

According to example embodiments, the adapter has a second bearing, e.g., a bearing arranged as a non-locating bearing, the outer ring of which is accommodated in the first housing part and the inner ring of which is fitted onto the adapter shaft. For example, a shaft seal ring is accommodated in the first housing part, e.g., on the side of the second bearing facing away from the clutch part, which seal ring seals towards the adapter shaft, e.g., the seal lip of the seal ring extending on the adapter shaft.

Thus, the distance between the fixed bearing and the non-locating bearing is variable in the event of thermally induced changes in length, because the non-locating bearing is displaceable in the axial direction, e.g., slightly displaceable.

According to example embodiments of the present invention, a geared motor includes an adapter, an electric motor, and a transmission. A rotor shaft is rotationally fixed to the clutch part, e.g., by a key connection, and the adapter shaft is rotationally fixed to a driving toothing part of the transmission or is arranged in one piece, e.g., in one part, therewith.

Thus, the geared motor can be arranged as compact as possible.

Further features and aspects of example embodiments of the present invention are explained in more detail below with reference to the appended schematic Figures.

DETAILED DESCRIPTION

As illustrated in FIGS. 1 to 5, the adapter shaft 1 has dogs 5 at its axial end region facing the clutch part 7, which cover an axial region that overlaps with the axial region covered by dogs 8 of the clutch part 7.

The axial direction is parallel to the axis of rotation of the adapter shaft 1. The radial distances are relative to the axis of rotation of the adapter shaft 1.

One damping part 6 is shaped as a plastic star. For this purpose, the damping part 6 has an annular base body on which beam regions which protrude in the radial direction are formed.

The base body is arranged radially inside the dogs 5 and 8. The radial distance range covered by the beam regions in the radial direction includes or at least overlaps with the radial distance range covered by the dogs 5 of the adapter shaft 1 in the radial direction and with the radial distance range covered by the dogs 8 of the clutch part 7 in the radial direction.

The damping part 6, e.g., the beam regions, are arranged in the circumferential direction between the dogs 5 of the adapter shaft 1 and the dogs 8 of the clutch part 7.

The beam directions are spherical in the radial direction. Thus, the wall thickness of the respective beam region measured in the circumferential direction has a local maximum in the radial direction.

The region covered by the dogs 5 of the adapter shaft 1 in the axial direction overlaps with the region covered by the dogs 8 of the clutch part 7 in the axial direction.

The clutch part is fitted onto a rotor shaft 20, which protrudes through the clutch part 7 into a hollow region of the adapter shaft 1.

The rotor shaft 20 is rotationally fixed to the clutch part 7, e.g., by a key connection.

A bearing, which, for example, is arranged as a fixed bearing, is fitted onto the adapter shaft 1.

For this purpose, the inner ring 3 of the bearing is fitted onto the adapter shaft 1 and axially delimited on both sides by two retaining rings 2, 4.

A first retaining ring 2 of the two retaining rings 2, 4 is provided in a first annular groove of the adapter shaft 1, and this first annular groove is at a distance in the axial direction from the region covered by the dogs 5 of the adapter shaft 1 in the axial direction. This means that the first annular groove is completely uninterrupted in the circumferential direction.

The second retaining ring 2 of the two retaining rings 2, 4 is provided in a second annular groove of the adapter shaft 1, and this second annular groove is arranged in the axial direction within the region covered by the dogs 5 of the adapter shaft 1 in the axial direction. This means that the second annular groove is interrupted at multiple points in the circumferential direction. The dogs 5 are spaced from each other in the circumferential direction, e.g., evenly spaced. Since the inner ring 3 of the bearing is fitted onto the adapter shaft 1 and touches the adapter shaft 1 in the region located axially between the two retaining rings 2 and 4, the inner ring 3 is not supported in the regions between the dogs 5. The bearing seat thus is interrupted at multiple points in the circumferential direction.

The bearing seat on the adapter shaft 1 adapted for accommodating the inner ring 3 thus covers a region in the axial direction which overlaps with the region covered by the dogs 5 of the adapter part 1 in the axial direction.

This means that the bearing seat is interrupted in a first region and uninterrupted in a further region.

The first region contributes 30% to 70% of the total axial width of the bearing seat. The further, i.e., uninterrupted, region contributes the remaining part.

However, a configuration in which the first region contributes less than half, i.e., less than 50%, of the total axial width of the bearing seat may be utilized.

Figure 4:
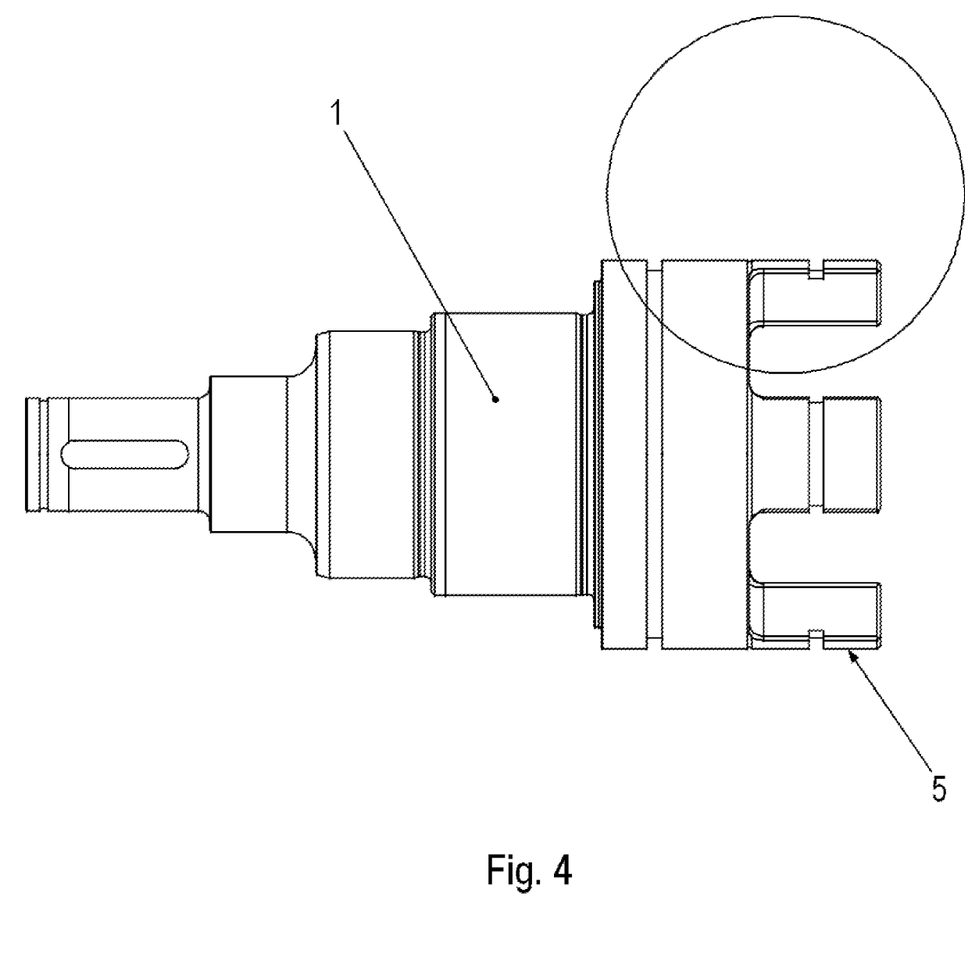
FIG. 4 is a side view of the adapter shaft 1.
Figure 5:
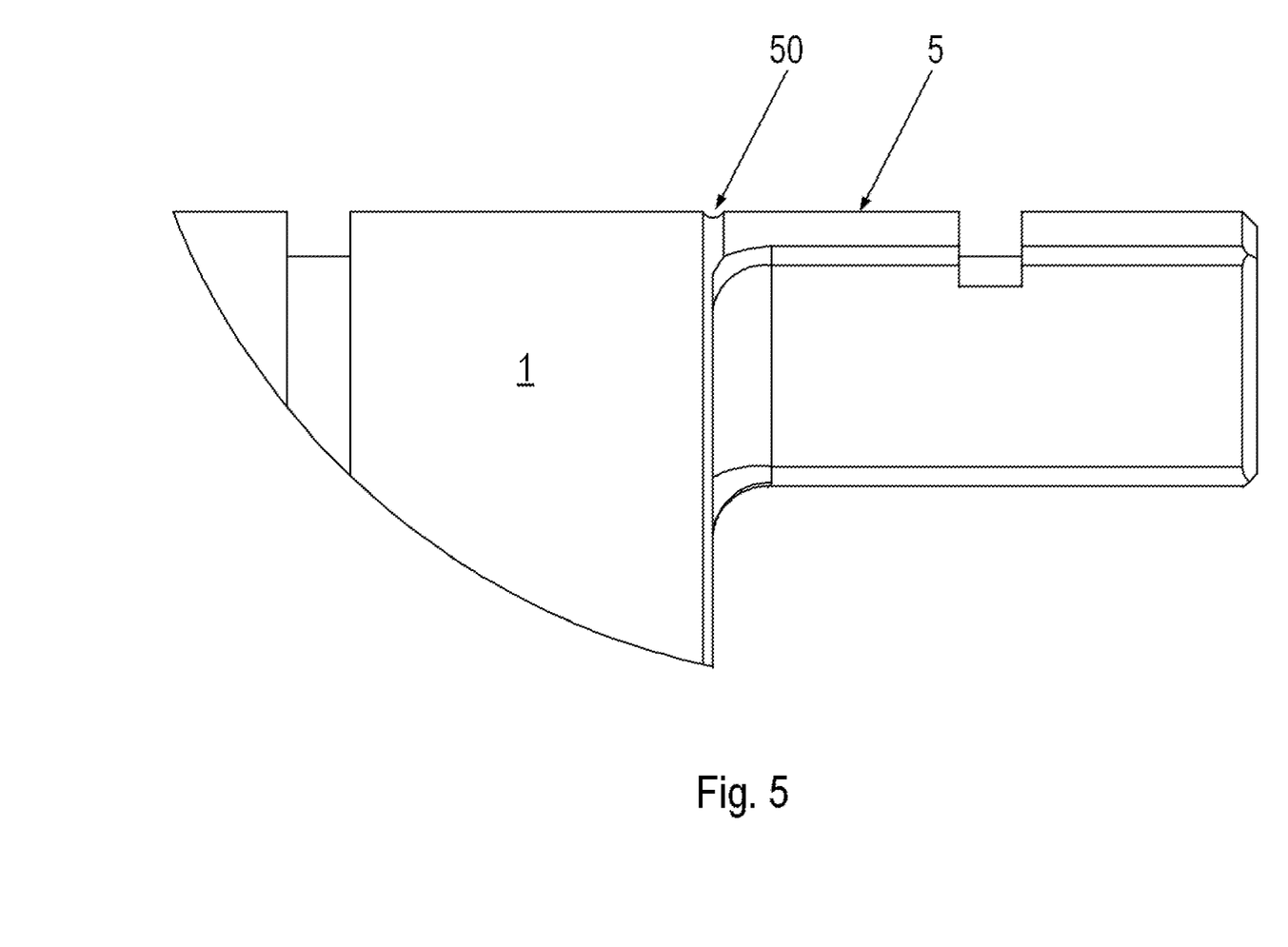
FIG. 5 is an enlarged view of a portion of FIG. 4.

As illustrated, for example, in FIG. 5, which is an enlarged region of FIG. 4, there is a cutout 50 on the adapter part 1, which cutout 50 is circumferential. For example, the cutout 50 is machined by turning, e.g., arranged as a recess.

This recess 50 is arranged in the axial transition region between the first and the further region. Thus, the cutout 50, e.g., the recess, is arranged at the edge of the region covered by the dogs 5 in the axial direction.

The cutout 50, e.g., the recess, thus delimits the region of the bearing seat interrupted in the circumferential direction from the remaining bearing seat, i.e., from the region of the bearing seat which is uninterrupted in the circumferential direction.

Thus, the cutout 50 is arranged in the axial direction between the first annular groove for the first retaining ring 2 and the second annular groove for the second retaining ring 4.

Figure 3:
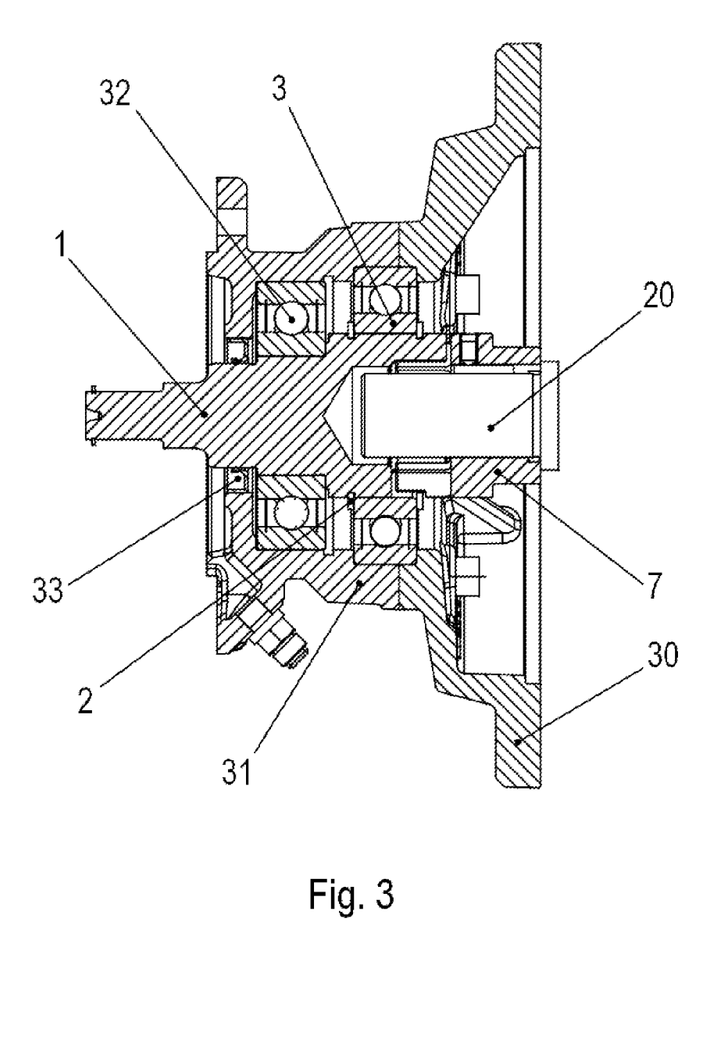
FIG. 3 is a cross-sectional view of an adapter.

As illustrated in FIG. 3, a second bearing is fitted onto the adapter shaft 1, which second bearing is accommodated in a second housing part 31 and is arranged as a non-locating bearing.

The second housing part 31 is connected to a first housing part 30, e.g., by screws.

Although the inner ring 3 of the first bearing partially has an interrupted bearing seat, as described above, the outer ring of this first bearing is partially accommodated in the first housing part 30 and partially in the second housing part 31.

Thus, the outer ring of the first bearing causes the centering of the first housing part 30 relative to the second housing part 31. In addition, a shaft seal ring 33 which seals towards the adapter shaft 1 is accommodated in the first housing part 30. This means that the first housing part is connectable to a transmission housing whose interior is at least partially filled with oil.

The adapter shaft protrudes into the transmission and is rotationally fixed to a driving toothing part of the transmission.

For example, the outer diameter of the dogs 8 of the clutch part 7 is smaller than the clear inner diameter of the second retaining ring 4, which is accommodated in the annular groove of the adapter part 1, which annular groove is interrupted in the circumferential direction. This means that no have to be in the region of the dogs of the clutch part.

According to example embodiments, the driving toothing part is arranged in one piece, i.e., in one part, with the adapter shaft 1.

Figure 1:
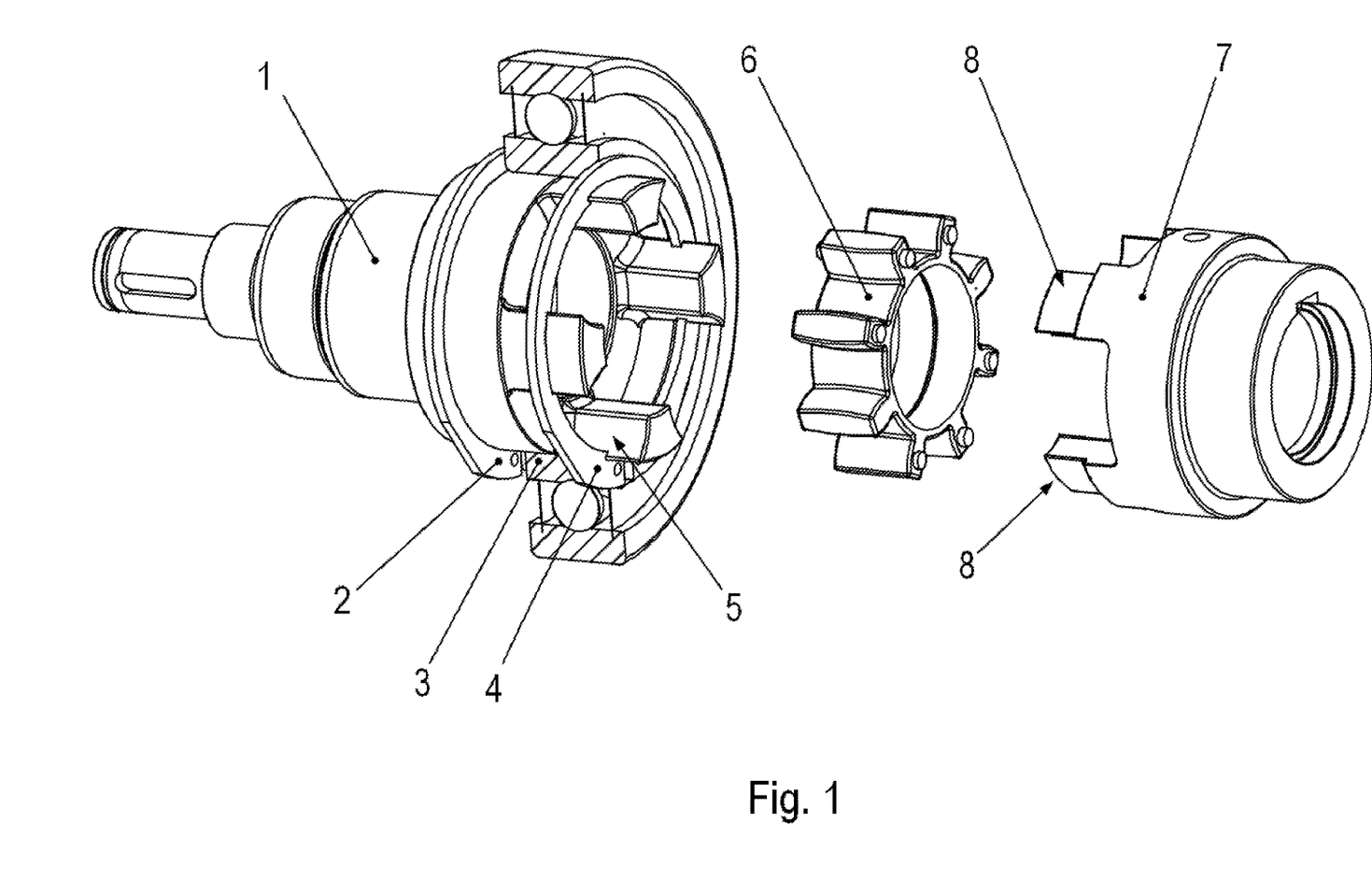
FIG. 1 is an exploded view of a dog clutch with the adapter shaft 1.
Figure 2:
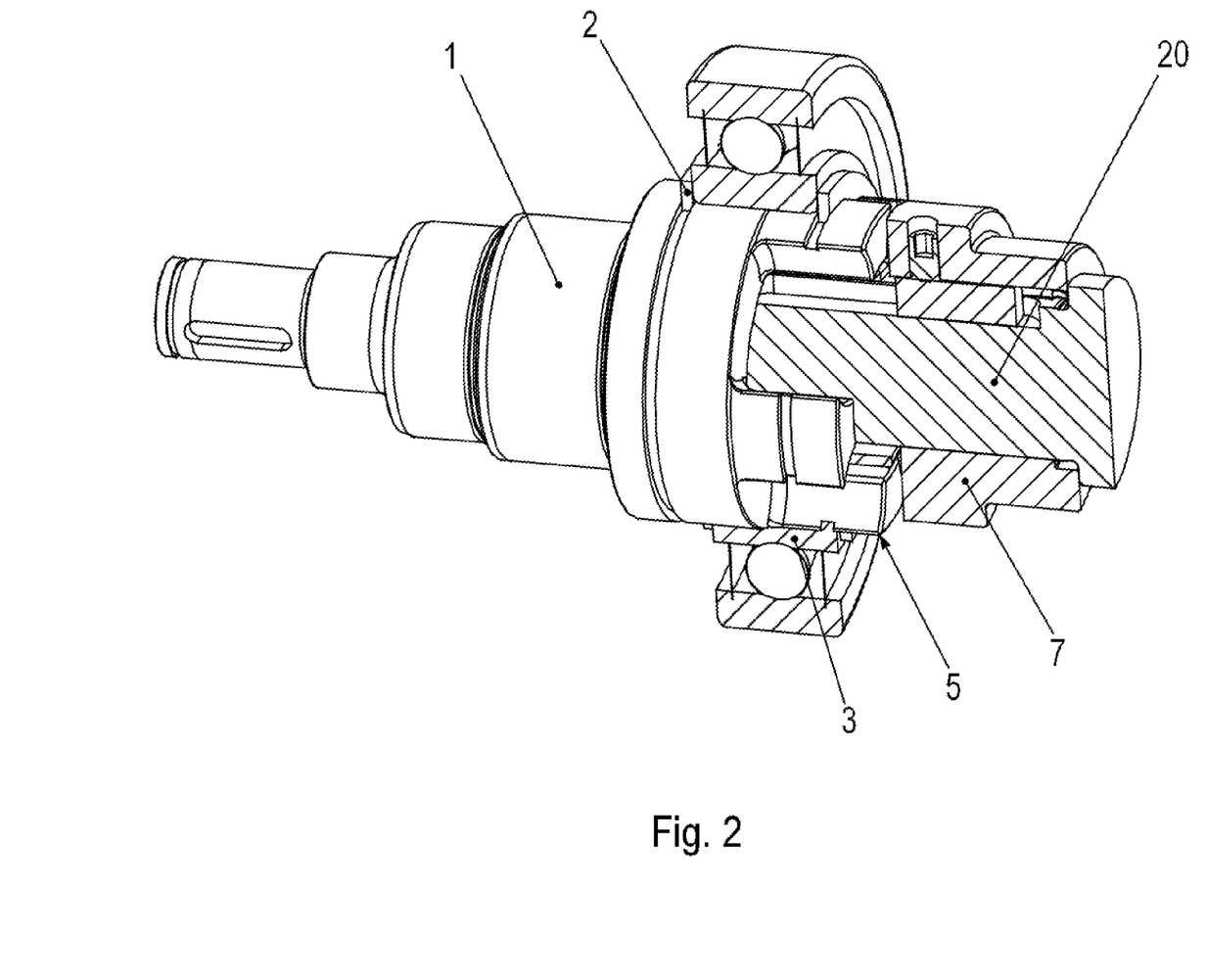
FIG. 2 is a cross-sectional view of the dog clutch.
Figure 6:
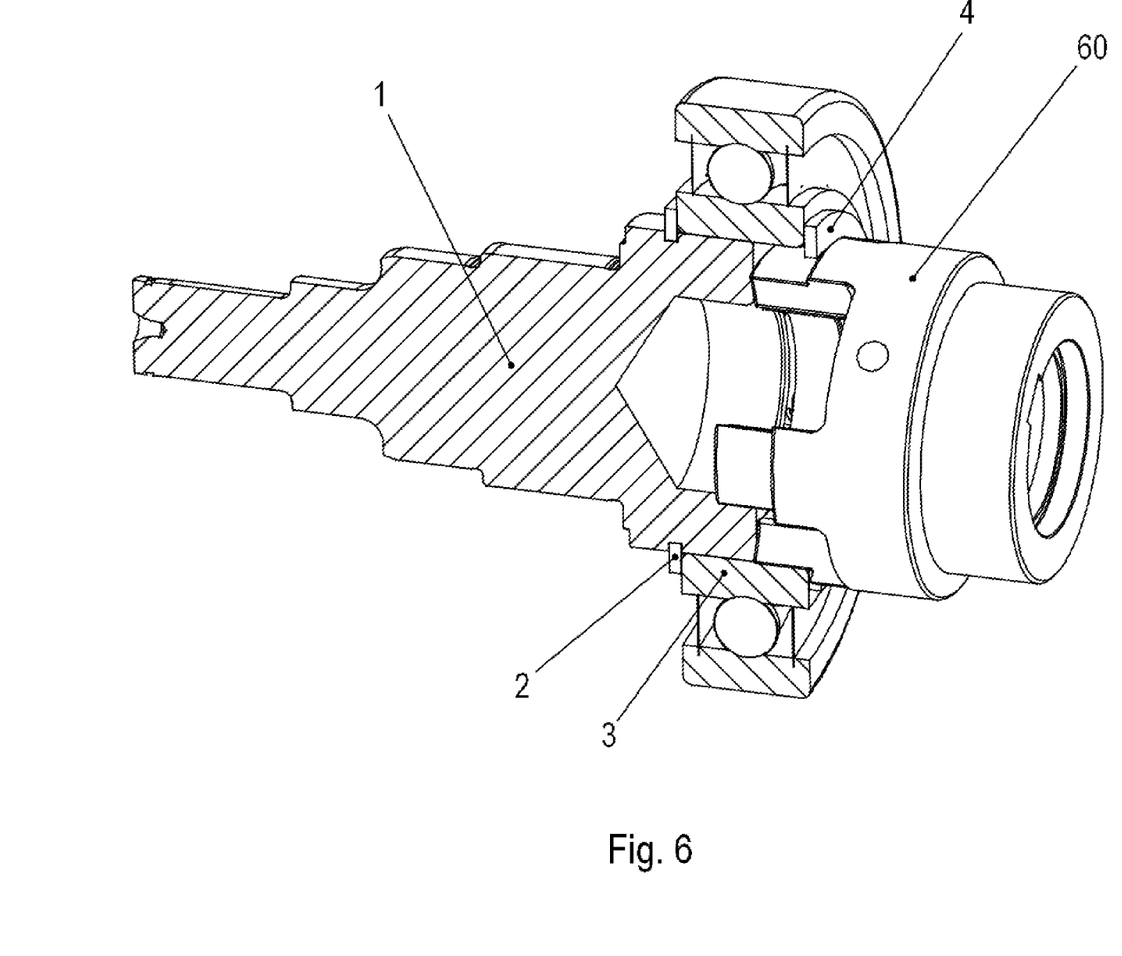
FIG. 6 is a cross-sectional view of a second dog clutch.

In the configuration illustrated in FIG. 6, in contrast to that illustrated in FIG. 2, the dogs 5 of the adapter part do not protrude axially through the inner ring 3, but the inner ring 3 protrudes axially over the adapter part 1 towards the clutch part 60, the dogs 8 of which are also correspondingly shorter compared to FIG. 2.

The second retaining ring 4 is thus accommodated in an annular groove of the coupling part 60 and delimits the inner ring 3 accordingly.

In this manner, a particularly small axial width of the clutch is achievable, in which the inner ring 3 is delimited on the one side by the first retaining ring 2, which is accommodated in an annular groove of the adapter part 1, and on the other side by the second retaining ring 4, which is accommodated in an annular groove of the clutch part 60.

LIST OF REFERENCE NUMERALS

1 Adapter shaft
2 Retaining ring
3 Inner ring of the fixed bearing
4 Retaining ring
5 Dogs
6 Damping part
7 Clutch part
8 Dogs
20 Rotor shaft
30 First housing part
31 Second housing part
32 Non-locating bearing
33 Shaft seal ring
50 Cutout, circumferential recess
60 Clutch part

The invention claimed is:

1. An adapter, comprising:
an adapter shaft including dogs and a bearing seat;
a clutch part; and
a bearing including an inner ring arranged in the bearing seat;
wherein the bearing seat covers, in an axial direction, a first region in which the bearing seat is uninterrupted in a circumferential direction, and a second region in which the bearing seat is interrupted in the circumferential direction; and
wherein the clutch part includes dogs, a damping part being arranged between the dogs of the clutch part and the dogs of the adapter shaft.

2. The adapter according to claim 1, wherein the adapter is arranged as an adapter for a geared motor, the bearing is arranged as a roller bearing, the dogs of the adapter shaft protrude in the axial direction, the bearing seat is arranged as a machined bearing seat, and in the second region, the bearing seat is interrupted in the circumferential direction at multiple locations.

3. The adapter according to claim 1, wherein the damping part includes a base body and beam regions formed thereon that protrude in a radial direction, each of the beam regions is arranged axially between a respective dog of the clutch part and of the adapter part.

4. The adapter according to claim 1, wherein a circumferential cutout and/or a recess is provided on the adapter shaft in the axial direction between the first region and the second region.

5. The adapter according to claim 1, wherein a region covered by the dogs in the axial direction includes the first region and is at a distance from the second region in the axial direction.

6. The adapter according to claim 1, wherein the axial direction is aligned parallel to an axis of rotation of the adapter shaft.

7. The adapter according to claim 1, wherein the inner ring is axially delimited on both sides by retaining rings.

8. The adapter according to claim 1, wherein the bearing is arranged as a fixed bearing.

9. An adapter, comprising:
an adapter shaft including dogs and a bearing seat;
a clutch part; and
a bearing including an inner ring arranged in the bearing seat;
wherein the bearing seat covers, in an axial direction, a first region in which the bearing seat is uninterrupted in a circumferential direction, and a second region in which the bearing seat is interrupted in the circumferential direction; and
wherein a first retaining ring is accommodated in a first annular groove of the adapter shaft and delimits the inner ring, the first annular groove being located at a distance from the first region and/or from the dogs in the axial direction.

10. The adapter according to claim 9, wherein the first annular groove extends completely and/or uninterruptedly in the circumferential direction.

11. The adapter according to claim 9, wherein a second retaining ring delimits the inner ring and is accommodated in a second annular groove.

12. The adapter according to claim 11, wherein the second retaining ring delimits the inner ring on a side of the inner ring facing away from the first retaining ring in the axial direction.

13. The adapter according to claim 11, wherein the second annular groove is interrupted in the circumferential direction, is interrupted in the circumferential direction at multiple locations, and/or is located in the second region.

14. The adapter according to claim 11, wherein the second annular groove is arranged in the dogs of the adapter part and/or in dogs of the clutch part.

15. The adapter according to claim 11, wherein the second annular groove is uninterrupted in the circumferential direction and is arranged in the clutch part.

16. The adapter according to claim 9, wherein the clutch part includes dogs, a damping part being arranged between the dogs of the clutch part and the dogs of the adapter shaft.

17. An adapter, comprising:
an adapter shaft including dogs and a bearing seat;
a clutch part; and
a bearing including an inner ring arranged in the bearing seat;
wherein the bearing seat covers, in an axial direction, a first region in which the bearing seat is uninterrupted in a circumferential direction, and a second region in which the bearing seat is interrupted in the circumferential direction; and
wherein the adapter includes a housing having a first housing part and a second housing part, the first housing part being connected to the second housing part, an outer ring of the bearing being accommodated in the first housing part and the second housing part and centering the first housing part relative to the second housing part.

18. The adapter according to claim 17, further comprising a second bearing, an outer ring of the second bearing being accommodated in the first housing part, an inner ring of the second bearing being arranged the adapter shaft.

19. The adapter according to claim 18, wherein the second bearing is arranged as a non-locating bearing, a shaft seal ring being accommodated in the first housing part and/or on a side of the second bearing facing away from the clutch part, the shaft seal ring sealing toward the adapter shaft, the shaft seal ring including a seal lip arranged on the adapter shaft.

20. A geared motor, comprising:
an adapter including:
an adapter shaft including dogs and a bearing seat:
a clutch part; and
a bearing including an inner ring arranged in the bearing seat;
an electric motor; and
a transmission;
wherein the bearing seat covers, in an axial direction, a first region in which the bearing seat is uninterrupted in a circumferential direction, and a second region in which the bearing seat is interrupted in the circumferential direction; and
wherein a rotor shaft is rotationally fixed to the clutch part, and the adapter shaft is rotationally fixed to and/or is integral with a driving toothing part of the transmission.

21. The geared motor according to claim 20, wherein the rotor is rotationally fixed to the clutch part by a key connection.

* * * * *